United States Patent
Ilinich et al.

(10) Patent No.: US 9,757,784 B2
(45) Date of Patent: Sep. 12, 2017

(54) TEMPERATURE MEASUREMENT DEVICE FOR METAL SHEET

(71) Applicant: Ford Global Technologies, LLC, Dearborn, MI (US)

(72) Inventors: Andrey M. Ilinich, Novi, MI (US); Nia R. Harrison, Ann Arbor, MI (US); Brian Michael Brown, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 234 days.

(21) Appl. No.: 14/643,178

(22) Filed: Mar. 10, 2015

(65) Prior Publication Data

US 2016/0263638 A1    Sep. 15, 2016

(51) Int. Cl.
| | |
|---|---|
| G01K 1/14 | (2006.01) |
| B21D 22/02 | (2006.01) |
| G01K 7/04 | (2006.01) |
| B21D 22/20 | (2006.01) |

(52) U.S. Cl.
CPC ............ *B21D 22/022* (2013.01); *G01K 1/14* (2013.01); *G01K 7/04* (2013.01); *B21D 22/201* (2013.01)

(58) Field of Classification Search
CPC  G01K 1/04; G01K 1/16; G01K 7/008; G01K 7/223; G01K 7/226; H01C 7/223
See application file for complete search history.

(56) References Cited

U.S. PATENT DOCUMENTS

| | | |
|---|---|---|
| 7,666,267 B2 | 2/2010 | Benedictus et al. |
| 7,763,128 B2 | 7/2010 | Heymes et al. |
| 8,496,764 B2 | 7/2013 | Luckey et al. |

FOREIGN PATENT DOCUMENTS

| | | |
|---|---|---|
| EP | 0684883 B1 | 4/1997 |
| WO | 98/11267 A1 | 3/1998 |
| WO | 2009/130175 A1 | 10/2009 |
| WO | 2010/032002 A1 | 3/2010 |

OTHER PUBLICATIONS

IS-Rayfast Limited, "Material Safety Data Sheet for Cotronics," Oct. 2004, 10 pgs.
Alcoa, "Understanding Extruded Aluminum Alloys", Alcoa Engineered Products—Alloy 6082, Dec. 2002, 2 pgs.
Davis, J.R., "Aluminum and Aluminum Alloys", ASM Specialty Handbook, 1993, 6 pgs.

*Primary Examiner* — Adam Krupicka
(74) *Attorney, Agent, or Firm* — Damian Porcari; Brooks Kushman P.C.

(57) ABSTRACT

In at least one embodiment, a metal blank is provided including a metal sheet having a surface including at least one pair of channels defined therein. Each channel may have a first portion extending from an edge of the blank and a second portion in an interior of the blank. The second portion may be wider than the first portion. The blank may include at least one pair of thermocouple wires, with one wire being attached to each second portion. An adhesive material may be disposed in each second portion. The wires may be attached by welding and the adhesive material may be a metallic composite adhesive. The disclosed blank may be used to calibrate or otherwise assess a process where the blank is being heated or cooled, such as aluminum hot-stamping.

20 Claims, 11 Drawing Sheets

TEMPERATURE MEASUREMENT DEVICE FOR METAL SHEET

TECHNICAL FIELD

This disclosure relates to a temperature measurement device for metal sheet, for example, a metal stamping sheet.

BACKGROUND

Stamping of metal sheet (or sheet metal) is one common method of forming metal components. Metal stamping generally includes placing a sheet of generally flat or planar metal, called a blank, into a die set and closing the die set to form a component having a predetermined shape. In some stamping situations, the blank and/or the dies may be at an elevated or reduced temperature compared to room temperature or the ambient temperature. To improve the robustness and performance of the stamping process, it may be beneficial to be able to accurately measure the temperature of the blank during the stamping process.

SUMMARY

In at least one embodiment, a metal blank is provided comprising a metal sheet having a surface including at least one pair of channels defined therein. Each channel may have a first portion extending from an edge of the blank and a second portion in an interior of the blank. The blank may also include at least one pair of thermocouple wires, with one wire being attached to each second portion. An adhesive material may be disposed in each second portion.

The second portion may be wider than the first portion. In one embodiment, the first portion of each channel may extend continuously into the second portion of the channel and the portions may meet at a transition area. The wires may be attached to each second portion at an end of the second portion opposite the first portion. The wires may be welded to each second portion and the adhesive material may include a metallic composite adhesive. A portion of each wire may be secured within each first portion. In one embodiment, each first portion is deformed in at least one region to secure the wire. Each second portion may have a length of 5 to 500 mm, a width of 0.5 to 10 mm, and a depth of 0.25 to 5 mm and each first portion may have a width of 0.25 to 3 mm and a depth of 0.25 to 5 mm. A spacing between each pair of channels may be from 0.5 to 1000 mm. In one embodiment, the metal sheet is aluminum. Each second portion may be substantially filled with the adhesive material. Each first portion may be substantially free of adhesive material. In one embodiment, each wire extends from a point of attachment in the second portion of the channel, through the first portion of the channel, and beyond the edge of the blank.

In at least one embodiment, a hot-stamping system is provided. The system may include a furnace, a chillable die set, and a metal blank. The metal blank may have defined therein at least two channels extending to an edge, each channel including a first portion and a second portion. A thermocouple wire may be attached in the second portion of each channel and extend through the first portion outwardly past the edge. An adhesive material may be disposed within each second portion. Each wire may be connected to a temperature-measuring device.

The second portion of each channel may be wider than the first portion. The first portion and the second portion may meet at a transition area and the wires may be attached to each second portion at an end of the second portion opposite the transition area. In one embodiment, the wires are welded to each second portion and the adhesive material includes a metallic composite adhesive. Each second portion may have a length of 5 to 500 mm, a width of 0.5 to 10 mm, and a depth of 0.25 to 5 mm and each first portion may have a width of 0.25 to 3 mm and a depth of 0.25 to 5 mm.

In at least one embodiment, a method of manufacturing a temperature-sensing metal blank is provided. The method may include forming at least one pair of channels in a surface of a metal sheet, each channel including a first portion and a second portion. The method may further include attaching one thermocouple wire in the second portion of each channel, inserting an adhesive material into each second portion, and securing at least a portion of each wire in the first portion of each channel.

The forming step may include forming each channel with a first, narrower portion and a second, wider portion. Each second portion may be formed in an interior of the metal sheet and each first portion may extend from an edge of the metal sheet and meet the second portion at a transition area. The thermocouple wires may be attached at an end of the second portion that is opposite the transition area. In one embodiment, the attaching step includes welding the thermocouple wires in the second portion of each channel and the adhesive material in the inserting step includes a metallic composite adhesive.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Stamping of metal sheet is one common method of forming metal components, for example, automotive components. Automotive body panels have traditionally been made from mild steels, however, in an effort to decrease vehicle weight, aluminum alloy body panels have been increasing in popularity. For example, a system and method for manufacturing components from high-strength aluminum is disclosed in commonly owned U.S. Pat. No. 8,496,764, the disclosure of which is hereby incorporated in its entirety by reference herein. U.S. Pat. No. 8,496,764 generally describes a "hot stamping" process in which an aluminum alloy blank is heated and then stamped in a die set while still at an elevated temperature. The die set may be cooled, such that the blank is quenched as it is formed. The hot stamping process may be used to form components out of aluminum-zinc alloys of the 7xxx series. The 7xxx series alloys of aluminum at T6 or T7x tempers may have strengths similar to those of high and ultra-high strength steels and can achieve yield strengths exceeding 400 MPa.

Figure 1:
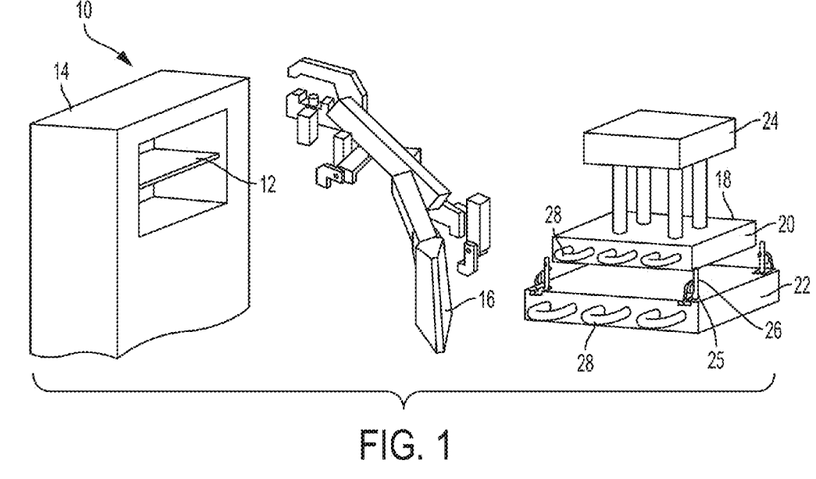
FIG. 1 is a perspective view of a hot-stamping system, according to an embodiment.
Figure 2:
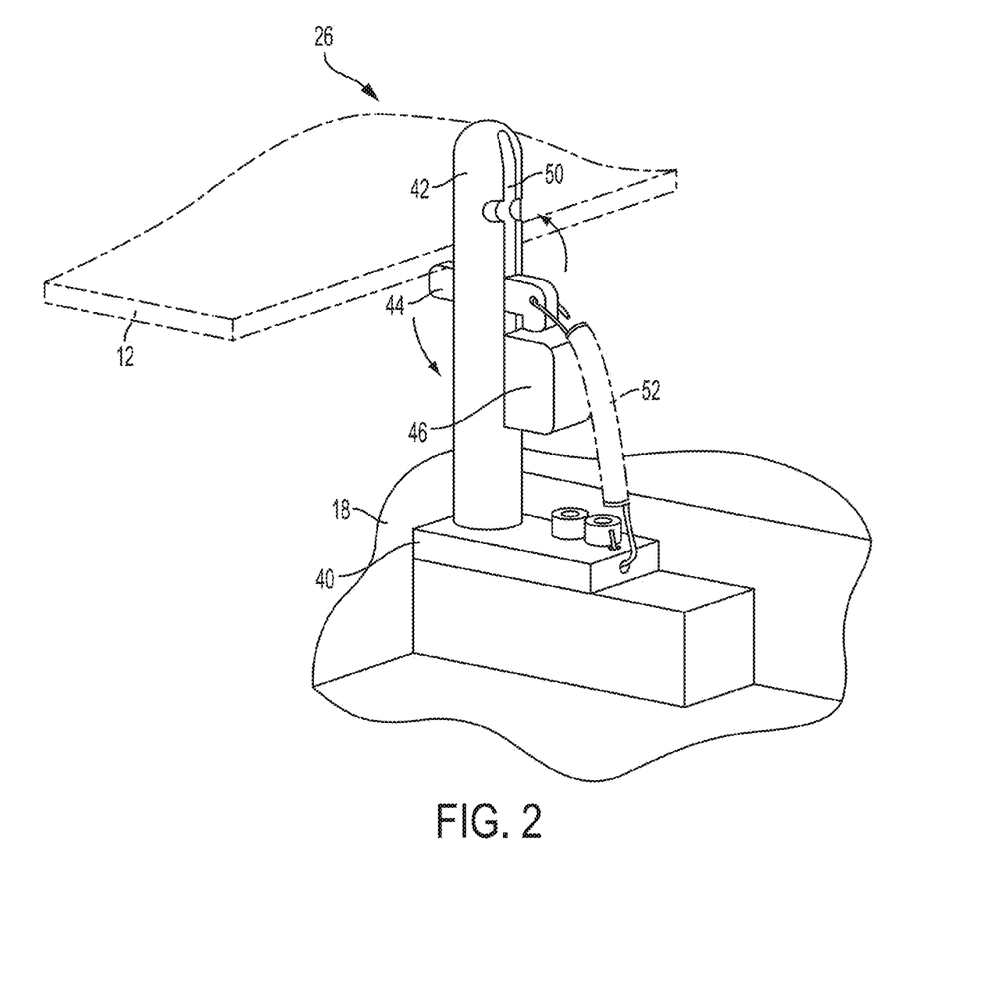
FIG. 2 is a partial perspective view of a die with a staging apparatus, according to an embodiment.

With reference to FIGS. 1 and 2, an example of a hot stamping system 10 is shown. The system 10 may include a heating apparatus 14, a transfer mechanism 16, and a die set 18. In at least one embodiment, the blank 12 is an F-temper 7xxx series aluminum alloy blank 12. Aluminum alloys are identified by a four-digit number, the first digit of which generally identifies the major alloying element. For example, the major alloying element in 7xxx series aluminum is zinc while the major alloying element of 5xxx series is magnesium and for 6xxx series is magnesium and silicon. Additional numbers represented by the letter "x" in the series designation define the exact aluminum alloy. In one embodiment, a 7075 aluminum alloy may be used that has a composition of 5.1-6.1% zinc, 2.1-2.9% magnesium, 1.2-2.0% copper, and less than half a percent of silicon, iron, manganese, titanium, chromium, and other metals.

The heating apparatus 14 may be provided to heat the blank 12. The heating apparatus 14 may be an industrial furnace or oven capable of producing internal temperatures high enough to heat blanks 12 placed in the heating apparatus 14 to a predetermined temperature, such as a solution or solidus temperature of the blank 12. In at least one embodiment, the heating apparatus 14 may not heat the blank 12 past its liquidus (melting) temperature. The solution temperature for a 7xxx series aluminum alloy may be approximately 460° C. to 490° C.

The transfer mechanism 16 may be configured to move and position the blank 12. In at least one embodiment, the transfer mechanism 16 may be a manipulator, such as a robot. The transfer mechanism 16 may be configured to quickly transfer the blank 12 from the heating apparatus 14 to the die set 18 to reduce the opportunity for heat loss from the blank 12. For example, the system 10 and transfer mechanism 16 may be configured such that the temperature of the blank 12 does not decrease to or below its critical quench temperature. The critical quench temperature is the temperature at which quenching must begin to achieve a proper quench of the material. For example, the critical quench temperature for most 7xxx series aluminum alloys is approximately 400° C.

The die set 18 may be provided to form the blank 12 into a part having a predetermined shape. In at least one embodiment, the die set 18 may include a first die 20, a second die 22, at least one actuator 24, and a staging apparatus 26. The first and/or second dies 20, 22 may be configured to form the blank 12 into the part having a predetermined shape. An actuator 24 may actuate the first die 20 and/or the second die 22 toward or away from each other and provide force to form the blank 12. The actuator 24 may be of any suitable type, such as hydraulic, pneumatic, mechanical, electromechanical, or combinations thereof. The die set 18 and actuator 24 combination may also be referred to as a machine press, stamping press, or quenching press.

A staging apparatus 26 may be provided for positioning the blank 12 between and spaced apart from the first and second dies 20, 22. As such, the staging apparatus 26 may inhibit conductive heat transfer between the blank 12 and the die set 18, thereby helping to maintain the blank 12 at or above its critical quench temperature. The staging apparatus 26 may receive the blank 12 from the transfer mechanism 16 and may release the blank 12 as the first die 20 and/or the second die 22 are closed and engage the blank 12. In addition, the system 10 may be configured such that little heat is lost from the blank 12 between removal from the heating apparatus 14 and closing of the die set 18. In at least one embodiment, the temperature of the blank 12 may decrease by less than 10° C.; however, the blank 12 could experience a greater temperature loss, such as up to a 90° C. assuming that the blank 12 is heated to 490° C. and the critical quench temperature is 400° C.

The die set 18 may include piping 28 that facilitates cooling of the first and/or second dies 20, 22 and quenching of the part formed from the blank 12. The piping 28 may be voids or channels formed into the die set 18, or any combination of externally connected piping and channels. The piping 28 may be connected to a cooling source and may receive a heat transfer medium, such as a fluid, from the cooling source for cooling the die set 18 to a desired temperature. The heat transfer medium may be any fluid medium capable of cooling the die set 18 to a predetermined temperature range, such as from 1° C. to 30° C. The die set 18 may be cooled in a manner that inhibits formation of condensation on one or more surfaces of the die set 18. In a mass production setting, the temperature of the die set 18 may be cooled to the predetermined temperature range before forming and quenching a blank 12 to remove heat that may have been transferred from a blank 12 to the die set 18 during forming of a previous part.

Forming the heated blank 12 into a part may occur simultaneously with quenching of the part. The quench rate affects the final temper strength and corrosion performance of the material. In some embodiments, the quench rate for the aluminum alloy, as it passes from 400° C. to 290° C., may be equal to or greater than 150° C./second. The part may be further cooled to a final temperature from 200° C. to 25° C. before removal of the part from the die set 18 to provide dimensional stability during subsequent processing.

The system 10 may be designed to operate continuously with a number of blanks 12 being heated in series or parallel by one or more heating apparatuses 14 and then transferred to at least one die set 18 for forming and quenching. At least one die set may become hotter than 30° C. during, or after, the forming of the blank 12 and/or simultaneous quenching of the part, and as such more than one die set 18 may be used to provide faster production speeds. The part may be removed from the die set 18 by the transfer mechanism 16, another transferring device, or by hand. The part then progresses on to subsequent processing which may include flanging, trimming, and a natural and/or artificial aging to bring the aluminum alloy part to a high strength temper, such as T6 or T7x.

Referring to FIG. 2, an embodiment of a staging apparatus 26 is shown in more detail. One or more staging apparatuses 26 may be provided with the die set 18. For example, a staging apparatus 26 may be provided proximate a corner or side of a die in one or more embodiments. A staging apparatus 26 may be positioned or configured so as not to interfere with actuation or closing of the die set 18. Moreover, the staging apparatus 26 may help insulate or may be provided with materials that inhibit heat transfer from the blank 12 to a die. The staging apparatus 26 may include a base 40, a support member 42, a finger 44, and an actuator 46.

The base 40 may be disposed on the die set 18 and may facilitate mounting of the staging apparatus 26. The support member 42 may extend from and may be fixedly disposed on the base 40. The support member 42 may include a slot 50. The slot 50 may be configured to receive and accommodate rotation of the finger 44. The finger 44 may be pivotally disposed on the support member 42. For example, a pivot pin may rotatably couple the finger 44 to the support member 42 in one or more embodiments. The finger 44 may rotate between a first position and a second position. In the first position, the finger 44 may extend away from the support member 42 and may support the blank 12. The finger 44 may rotate with respect to the support member 42 and toward or into the slot 50 to a second position (as indicated by the arrows in FIG. 2) to permit the blank 12 to disengage the staging apparatus 26 and drop onto a die, such as the second die 22.

The actuator 46 may be placed in proximity of the staging apparatus and may be used to provide position control of finger 44. For example, in some embodiments the actuator 46 may be an electric motor connected to the pivot pin which rotates the finger 44 from the first position to the second position when power is applied, and a spring 52 may return the finger 44 from the second position to the first position when power is removed. The actuator 46 may be controlled by an automated control system, or by an operator. The actuator 46 may also be a servomechanism utilizing electricity, hydraulics, pneumatics, magnetic, or mechanical principles, or any combination, to provide position control of the finger 44.

During the hot stamping process, it may be important to accurately measure the temperature of the blank 12 during the heat treatment step (e.g., solutionizing heat treatment) and/or during the cooling or quenching step. In the example of a 7xxx series aluminum alloy described above, the heat treatment generally must heat the blank 12 to a temperature of 460° C. to 490° C. in order to properly solutionize the aluminum. Then, the blank 12 may be quenched through a certain temperature range, such as 400° C. to 290° C., at a certain quench rate, such as at least 150° C./second. The part may then be further cooled to a final temperature of, for example, 200° C. to 25° C. before removal of the part from the die set 18. Accordingly, there are several stages of the hot stamping process in which the temperature of the blank is an important processing parameter. Temperature accuracy within ±3° C. may be required in order to produce a component having the desired/intended properties. Temperatures outside of the intended values (e.g., 10, 15, 20 or more degrees off) may be unacceptable for some processes. In addition, the blank 12 may be relatively large (e.g., more than a foot long and/or wide), which may result in temperature fluctuations within the blank depending on blank geometry, the ability of the furnace to heat the blank evenly, or other factors.

With reference to FIGS. 3 to 8, embodiments of a blank 12 including a temperature measurement device 60 are shown (e.g., a temperature-sensing blank). The device 60 may be incorporated into the blank 12 in order to calibrate, test, or otherwise assess or improve the performance of a stamping system, such as system 10. While the device 60 is described with reference to a hot stamping system 10 for stamping aluminum metal sheet, the device 60 may be used with any stamping system and with any type of metal sheet. For example, the device 60 may be used with aluminum, steel, titanium, or other metal sheets. The device may also be used during other stamping processes, heat treatment processes, quenching processes, or any other processes where measuring the temperature of a metal sheet is beneficial or important.

The device 60 may include one or more pairs 62 of thermocouple (TC) wires 64, 66. Thermocouples are generally formed from two different conductive materials (e.g., wires formed of metals or metal compositions). Thermocouples wires may be used as part of a thermocouple to measure the temperature of the blank 12. A thermocouple is a temperature-measuring device that includes two dissimilar conductors that contact each other or are physically/electrically connected at one or more spots, where a temperature differential is experienced by the different conductors (or semiconductors). If the conductors are not physically touching, but are connected by an intermediate material and in electrical communication, the thermocouple may be said to have a separated junction. In general, a separated junction does not affect the thermocouple's performance, provided that the temperature at both junction points is the same. The thermocouple may produce a voltage when the temperature of one of the spots differs from the reference temperature at other parts of the circuit. The wires 64, 66 may be coupled to a voltmeter (not shown) at one end to measure the voltage generated by the wires. The voltmeter, or electronics coupled to the voltmeter, may then determine the temperature at the tips 68 of the wires 64, 66 that are placed in contact with or near the region of the blank 12 to be measured. The thermocouple wires may be formed of any suitable material, for example those used in nickel alloy TCs (e.g., types E, J, K, M, N, or T), platinum/rhodium alloy TCs (e.g., types B, R, or S), tungsten/rhenium alloy TCs (e.g., types C, D, or G), or others known in the art (e.g., chromel-gold/iron alloys, type P, Pt/Mo, Ir/Rh, noble metal alloys).

Figure 3:
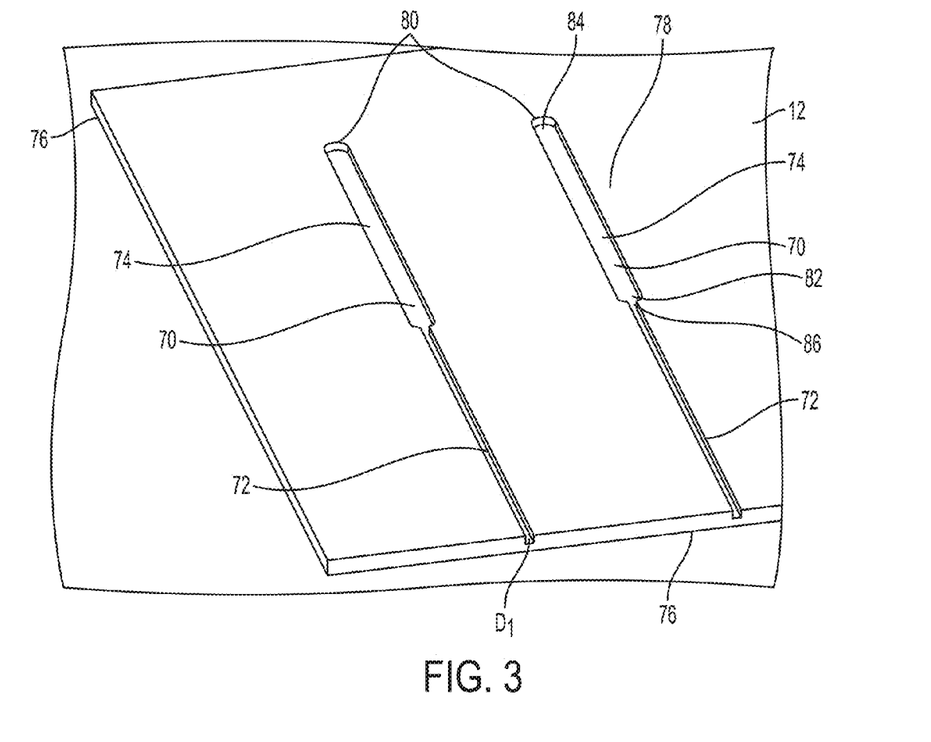
FIG. 3 is perspective view of a blank having channels formed therein, according to an embodiment.
Figure 4:
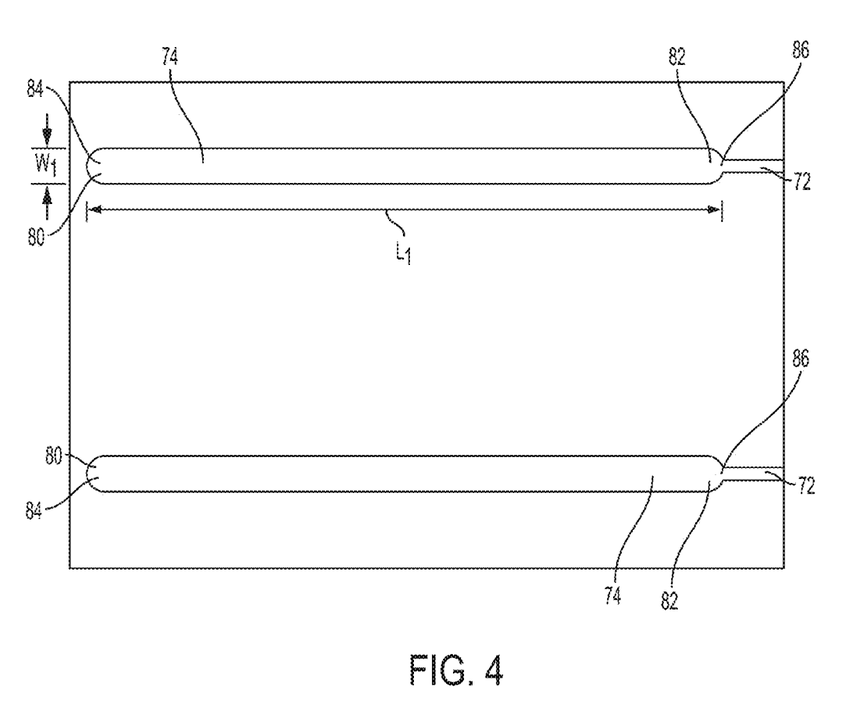
FIG. 4 is a top plan view of the blank of FIG. 3.

With reference to FIGS. 3-4, a blank 12 is shown with channels 70 defined therein. The number of channels 70 may match the number of TC wires to be attached to the blank 12. For example, if the device 60 includes one pair 62 of TC wires, then there may be two channels 70. If the device 60 includes three pairs 62 of TC wires, then there may be six channels 70. Each channel 70 may have a first, narrow portion 72 and a second, wide portion 74. The terms "narrow" and "wide" may be relative, such that the wide portion 74 has a greater width than the corresponding narrow portion 72 for each channel 70. In one embodiment, the channels 70 may extend from an edge 76 of the blank 12 into an interior 78 of the blank 12. For example, for a rectangular blank 12, there may be four edges 76 and the channel 70 may extend from one edge 76 to an interior 78 of the blank 12.

In at least one embodiment, the narrow portion 72 of the channel 70 may extend from the edge 76 of the blank 12 and the wide portion 74 may be located in the interior 78 of the blank 12. In one embodiment, the wide portions 74 of each channel 70 in the blank may have the same width and/or length. In another embodiment, the channels 70 may be formed as one or more pairs 80 of channels, and the pairs 80 may each correspond to a pair 62 of TC wires. In this embodiment, the wide portions 74 of each channel 70 in each pair 80 may have the same width and/or length and the narrow portions 72 of each channel 70 in each pair 80 may have the same width and/or length.

There may be multiple pairs 80 of channels 70 defined in the blank 12. In one embodiment, there may be a pair 80 of channels 70 formed in a middle of the blank 12 and near or adjacent two opposing edges 76 of the blank 12. For example, for a rectangular blank 12, there may be a pair 80 of channels 70 at the left edge, the middle, and the right edge of the blank 12. Alternatively, there may be a pair 80 of channels 70 at the top edge, the middle, and the bottom edge of the blank 12. The number of pairs 80 is not limited to one or three, and there may be any suitable number of pairs 80 of channels 70 defined in the blank, such as 2, 4, 5, 6, or more. In one embodiment, there may be a plurality of pairs 80 spaced across a dimension (e.g., length or width) of the blank 12. The pairs 80 may be evenly spaced across the blank 12 or unevenly spaced. In one embodiment, all the pairs 80 of channels 70 are oriented parallel to each other. For example, the channels 70 may all extend in a direction from a top edge to a bottom edge or from a right edge to a left edge.

In one embodiment, a length ($L_1$) of the wide portion 74 of the channel 70 may be from 5 to 500 mm, or any sub-range therein. For example, the length of the wide portion 74 may be 10 to 250 mm, 25 to 250 mm, 25 to 150 mm, 10 to 100 mm, 25 to 75 mm, 40 to 60 mm, or about 50 mm (e.g., ±5 mm). While lengths within these ranges may be beneficial for attaching a TC wire (described in more detail below), the length of the wide portion 74 may be less than or greater than these ranges. In one embodiment, a width ($W_1$) of the wide portion 74 of the channel 70 may be from 0.5 to 10 mm, or any sub-range therein. For example, the width of the wide portion 74 may be 1 to 8 mm, 1 to 6 mm, 1 to 5 mm, 2 to 5 mm, 1 to 4 mm, 2 to 4 mm, or about 3 mm (e.g., ±0.5 mm). While widths within these ranges may be beneficial for attaching a TC wire (described in more detail below), the width of the wide portion 74 may be less than or greater than these ranges. In one embodiment, a depth ($D_1$) (or height) of the wide portion 74 of the channel 70 may be from 0.25 to 5 mm, or any sub-range therein. For example, the depth of the wide portion 74 may be 0.5 to 3 mm, 0.5 to 2 mm, 0.5 to 1.5 mm, 0.75 to 1.5 mm, 0.75 to 1.25 mm, or about 1 mm (e.g., ±0.1 mm). Stated another way, the depth of the wide portion 74 may be from 5 to 95% of the thickness of the blank 12, or any sub-range therein. For example, the depth may be from 10 to 90%, 20 to 80%, or 25 to 75% of the thickness of the blank 12, or other sub-ranges. While depths within these ranges may be beneficial for attaching a TC wire (described in more detail below), the depth of the wide portion 74 may be less than or greater than these ranges. In one embodiment, a spacing between the wide portions 74 in a pair 80 of channels may be from 0.5 to 1000 mm, or any sub-range therein. For example, the spacing may be from 1 to 500 mm, 1 to 250 mm, 1 to 100 mm, 5 to 75 mm, 5 to 50 mm, 10 to 45 mm, 15 to 40 mm, 20 to 35 mm, 20 to 30 mm, or about 25 mm (e.g., ±3 mm). The spacing may be determined from a center line of the channels 70.

In one embodiment, a width ($W_2$) of the narrow portion 72 of the channel 70 may be from 0.25 to 3 mm, or any sub-range therein. For example, the width of the narrow portion 72 may be 0.3 to 1.5 mm, 0.3 to 1.25 mm, 0.3 to 1 mm, 0.4 to 1 mm, 0.4 to 0.8 mm, 0.5 to 0.7 mm, or about 0.6 mm (e.g., ±0.1 mm). The width of the narrow portion 72 may also be determined based on a size or diameter of a TC wire to be inserted therein. In one embodiment, the narrow portion 72 may have a width that is slightly larger (e.g., about 0.1 mm) than the diameter of the TC wire. In another embodiment, the width of the narrow portion 72 may be 1.05 to 1.3 times larger than the diameter of the TC wire, or any sub-range therein. For example, the narrow portion 72 may be 1.1 to 1.25 times larger, 1.15 to 1.2 times larger, or about 1.18 times larger (e.g., ±0.02) than the TC wire. In one embodiment the diameter of the TC wire is measured with casing. In another embodiment the diameter of the TC wire is measured without casing (e.g., bare wire). While widths within these ranges may be beneficial for attaching a TC wire (described in more detail below), the width of the narrow portion 72 may be less than or greater than these ranges.

The length of the narrow portion 72 of the channel 70 may vary based on the size of the blank 12 in which it is formed and/or the location of the wide portion 74 within the blank 12. In general, the wide portion 74 may have a length as described above, regardless of the size of the blank 12. The narrow portion 72 may extend from the wide portion 74 to an edge 76 of the blank 12. Therefore, the length of the narrow portion 72 may increase or decrease depending on the size of the blank 12 and/or location of the wide portion 74. If the blank 12 is very large and/or if the wide portion 74 is centered within the blank 12, then the narrow portion 72 may be relatively long, while if the blank 12 is small and/or the wide portion 74 located close to an edge 76 of the blank 12, the narrow portion 72 may be relatively short. Accordingly, the narrow portion 72 may have any suitable length that connects the wide portion 74 of the channel 70 to an edge 76 of the blank 12. The depth ($D_2$) of the narrow portion 72 of the channel 70 may be within the same values as those described above for the wide portion 74. In one embodiment, the narrow portion 72 and the wide portion 74 may have the same depth. However, in another embodiment, the narrow portion 72 and the wide portion 74 may have different depths. The depths of the portions 72 and/or 74 may also vary along their lengths—either in absolute terms or as a percentage of the thickness of the blank 12. For example, the blank 12 may have a non-uniform thickness, therefore if the portions 72 and/or 74 have a uniform depth then the depth as a percentage of the blank thickness may be non-uniform. If, however, the portions 72 and/or 74 maintain a constant depth as a percentage of blank thickness, then the absolute depths of the portions may be non-uniform.

The channels 70, and the narrow portions 72 and wide portions 74 thereof, may be formed in the blank 12 using any suitable method. In one embodiment, the channel 70 may be machined into the blank 12. For example, the channel 70 may be formed by routing, milling, or grinding. The channels may be formed manually or automatically, such as by computer numerical control (CNC). Other methods known in the art for machining a groove or channel may also be used, such as cutting or chiseling (e.g., by hand or by machine). Methods other than machining may also be used to form the channel 70. For example, the channel 70 may be formed in the blank 12 as part of the blank-forming process, such as by stamping, casting, or molding. The channel 70 may also be formed by electrical discharge machining (EDM). EDM generally includes creating an electrode with an in-pane shape of the channel 70 and then burning the channel to a desired depth. The channels 70 may have a transverse cross-section (e.g., perpendicular to a long-axis) that is rectangular in shape. In a top plan view (e.g., as shown in FIG. 4), the wide portion 74 may have rounded ends, however, the ends may also be substantially flat or have other configurations. One end 82 may be adjacent to the narrow portion 72 such that there is a transition area or region 86 between the wide portion 74 and the narrow portion 72. The other end 84 may be opposite end 82 and the transition area 86 to the narrow portion 72.

With reference to FIGS. 3-8, embodiments of a blank 12 having a temperature measurement device 60 attached thereto are shown during various stages of formation. While the device 60 is shown and described with one pair 62 of TC wires attached in one pair 80 of channels 70, it is to be understood that a plurality of pairs of wires may be attached in a plurality of channels by repeating the disclosed steps. For example, as described above, there may be three pairs of TC wires and three pairs of channels, with a pair located in the middle and at opposite sides of the blank 12.

Figure 5:
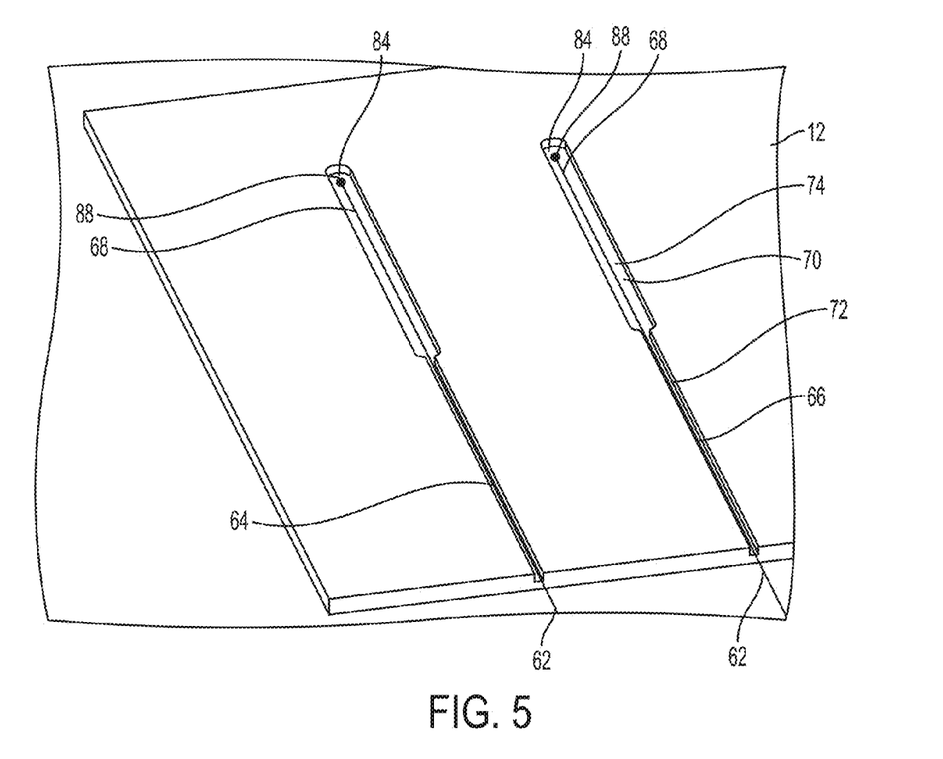
FIG. 5 is a perspective view of the blank of FIG. 3 with thermocouple wires attached thereto, according to an embodiment.

The TC wires 64 and 66 may each have tips 68 at one end. In one embodiment, the tips 68 of each wire 64, 66 may be attached to the blank 12 in a channel 70 at an attachment point 88. One pair 62 of TC wires may be attached to a pair 80 of channels 70 (e.g., one wire in each channel). In one embodiment, each tip 68 may be attached at, near, or adjacent to the end 84 of the channel 70 that is opposite the narrow portion 72. The tips 68 may be attached to the channels 70 with an electrically and thermally conductive connection to form a separated junction. In one embodiment, the tips 68 are welded to the channels 70. However, other methods of attachment may also be used, such as an electrically conductive adhesive, brazing, soldering (for relatively low temperature applications), or other methods known in the art. For example, the tips 68 may be attached using fasteners, such as screws or bolts. In addition, the tips 68 may be secured within a second narrow portion 72 extending from an opposite side of the first narrow portion 72 in a manner similar to that described below (e.g., in paragraph 0054). The tips 68 of the TC wires 64, 66 may be attached such that a remainder of each wire extends towards the end 82 adjacent to the narrow portion 72. Accordingly, a portion of each wire 64, 66 may extend within the wide portion 74 of the channel 70 between the end 84 and the transition area 86 (e.g., as shown in FIG. 5). While the a single attachment point has been described, the tips 68 may be attached to the channels 70 at multiple attachment points or by a continuous attachment segment.

Figure 6:
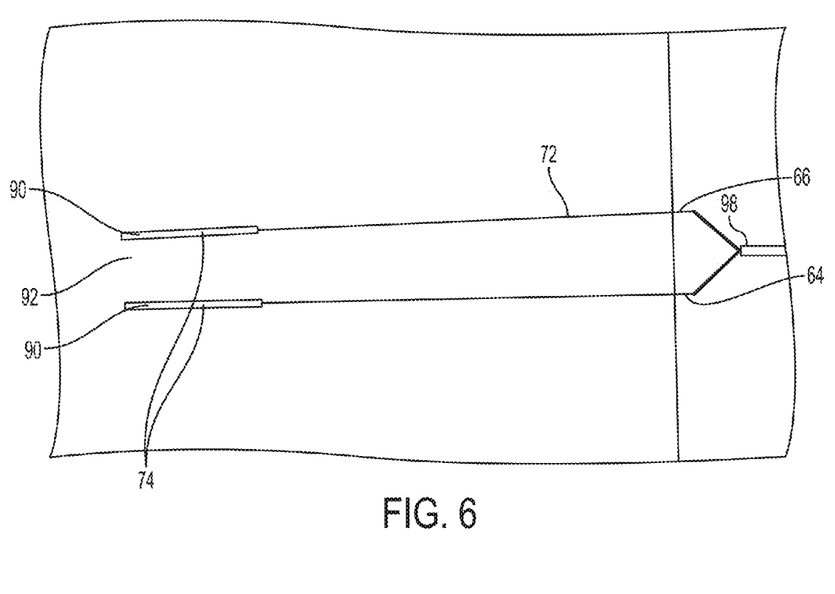
FIG. 6 is a top plan view of the blank of FIG. 5 with an adhesive material disposed in the wide portion of each channel, according to an embodiment.

After the TC wires 64, 66 have been attached to the blank 12 in the wide portions 74 of the channels 70, the wires may be further secured within the wide portions 74 by an adhesive or binder material 90. The adhesive material 90 may be introduced into the wide portion 74 of each channel 70 to secure the portions of the wires 64, 66 that are within the wide portion 74 to the blank 12. The adhesive material 90 may include any suitable material that binds, sticks, or attaches to the materials that form the wires 64, 66 and the blank 12 (e.g., metals). The adhesive material 90 may be chosen depending on the temperatures, forces, or other conditions that the blank 12 will experience during use. For example, an adhesive material 90 for an aluminum hot stamping process (such as described above) may need to withstand temperatures of 490° C. without melting, burning, cracking, or otherwise failing. The adhesive material may also need to withstand the forces of the die set 18 and/or the rapid quench to the temperature of the die set 18 (e.g., about 1-30° C.).

In one embodiment, the adhesive material 90 includes a composite adhesive. The composite adhesive may be a metal-based or metallic composite adhesive. In one embodiment, the metallic composite adhesive may include a metal or metal alloy and a refractory oxide. The metal or metal alloy may include aluminum (or Al alloy), nickel (or Ni alloy), or steel (e.g., a stainless steel, such as 316). The metallic composite may be a multiple-component adhesive including, for example, a base and a binder. The base may include the metal/metal alloy and refractory oxide and the binder may include water and one or more of alumina, phosphate, silica, and a silicate. Suitable examples of a metallic composite adhesive may include those provided by Cotronics under the name Durabond™. For example, Durabond™ 950, 952, and 954, which are aluminum, nickel, and stainless steel based, respectively. Additional information regarding the Durabond™ adhesives may be found in the Material Safety Data Sheet (MSDS), revision date October 2004, the disclosure of which is hereby incorporated in its entirety by reference herein.

Once applied, the adhesive material 90 may completely fill or substantially fill the wide portion 74 of the channel 70 (e.g., at least 95% filled). The adhesive material 90 may be flush with a top surface 92 of the blank 12 or slightly below it. This may prevent or mitigate direct impact of the adhesive material 90 during a subsequent stamping process. The adhesive material 90 (e.g., a metallic composite adhesive) may be applied as a liquid or a paste and then cured or dried to have the properties above. The adhesive material 90 may dry or cure at room temperature over time, or heat or a hardener/additive may be applied to speed the drying/curing time. In at least one embodiment, the narrow portion 72 of the channel may include no adhesive material 90 or substantially no adhesive material 90 (e.g., in less than 1% of the volume of the narrow portion).

The adhesive material 90 (e.g., metallic composite adhesive) may provide additional adhesion between the wires 64, 66 and the blank 12 in the wide portion 74. This additional adhesion may ensure that the tips 68 of the wires 64, 66 remain in contact (physical and electrical) with the blank 12. Electrical contact of the wires with the blank may be required for the thermocouple to work properly and physical contact may be required so that heat is effectively transferred from the blank to the wires. In one embodiment, the tips 68 of the wires 64, 66 are welded in the wide portion 74 of the channel 70 and a metallic composite adhesive is inserted to fill-in the remaining space in the wide portion 74 of the channel and to further secure the wires in the wide portion of the channel. Welding of the wires 64, 66 to the channel 70 may provide very good electrical and physical contact between the wires and the blank 12. However, the weld may be relatively weak and/or brittle and may not be able to sustain the temperatures or forces that are exerted on the weld point during a hot stamping process and/or handling. Accordingly, welding alone may be insufficient to maintain the wires 64, 66 in contact with the channel 70. The metallic composite adhesive (or other adhesive material) provides additional security and adhesion between the blank 12 and the wires 64, 66. Since the tips 68 may be welded in the channel 70, the adhesive can be electrically and thermally insulating, since the welds provide conductivity (thermal and electrical) between the blank 12 and the wires 64, 66.

Figure 7:
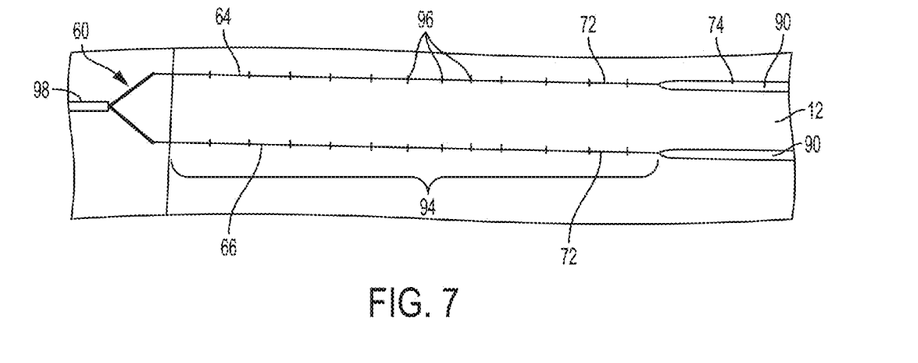
FIG. 7 is a perspective view of a thermocouple wire being secured within the narrow portion of a channel, according to an embodiment.

After the adhesive material 90 has dried or cured, a portion 94 of each of the wires 64, 66 that extend away from the transition area 86 and towards an edge 76 of the blank 12 may be secured within the narrow portion 72 of each channel 70. As described above, the narrow portion 72 may have a width that is slightly larger than a size or diameter of the wires 64, 66. The TC wires 64, 66 may have varying diameters depending on the application. In one embodiment, the TC wires 64, 66 may have a diameter (e.g., outer diameter) of 0.2 to 2 mm, or any sub-range therein. For example, the wires 64, 66 may have a diameter of 0.3 to 1.5 mm, 0.3 to 1 mm, 0.3 to 0.8 mm, 0.4 to 0.7 mm, 0.4 to 0.6 mm, or about 0.5 mm (e.g., ±0.05 mm).

The portions 94 of the wires 64, 66 may be secured within the narrow portions 72 using any suitable method. In one embodiment, the narrow portion 72 of the channel 70 may be crimped at one or more location such that the channel is deformed to secure or lock-in the wire. One example of a crimping method is chiseling or spot chiseling the narrow portion 72 of the channel 70 in one or more locations. During the chiseling process, a chisel tip may be impacted while in contact with the channel 70, causing the walls of the channel to deform and secure the wire therein. Each wire 64, 66 may be spot chiseled in a plurality of locations 96 along a length of the narrow portion 72 of the channel 70 to secure the wire 64, 66 within the channel. Securing the wires 64, 66 within the channel may prevent the wire from being directly impacted during, for example, a stamping process. If a thin wire was exposed during a stamping process, it would likely be crushed, severed, broken, or otherwise damaged, thereby causing the thermocouple to cease operation. Additionally, it would interfere with the stamping and quenching processes, and could leave a mark on the die surface.

Figure 8:
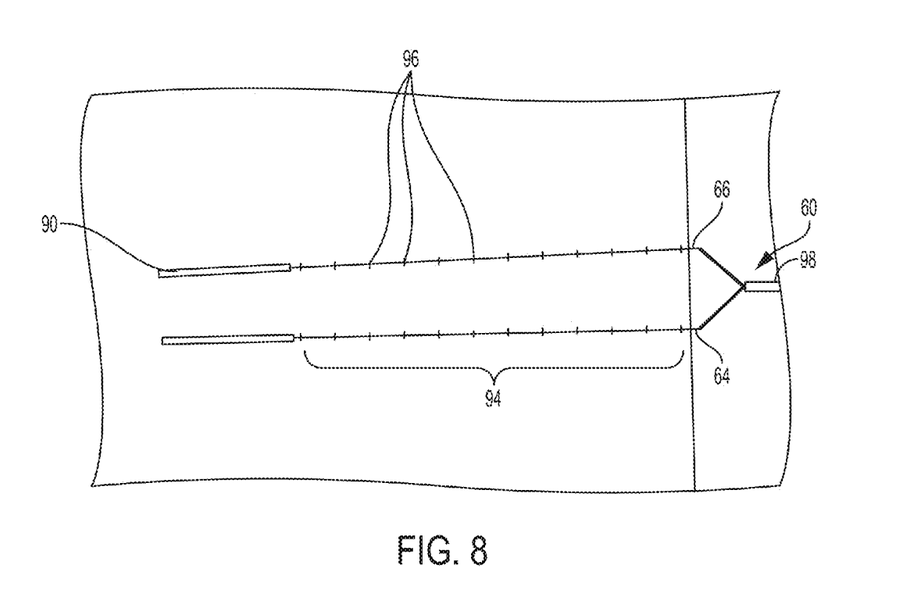
FIG. 8 is a top plan view of a completed temperature-sensing blank, according to an embodiment.

The portions 94 of the wires 64, 66 secured within the narrow portions 72 may be bare wire or they may have a casing/coating 98. Bare wire may mean that the wire has no insulating coating or casing thereon, such that the wire is only metal. In some embodiments, the portions 94 of the wires 64, 66 may have a casing or coating 98 surrounding the metal wire. The casing 98 may surround the wire along the entire length of the narrow portion 72. The casing may end at or near the transition area 86, such that it does not substantially extend into the wide portion 74. In another embodiment, the casing 98 may extend within the wide portion 74, for example, all the way to just before the tip 68 (to allow for electrical and thermal conduction). The casing 98 may be formed of any suitable material that is electrically insulating and able to withstand the temperatures at which the thermocouple will be used. Examples of suitable casing materials may include glass or silica braids or wraps, ceramic fibers or wraps, cotton braid, or a polymer (e.g., polyvinyl, nylon, PVC). For the relatively high temperatures of hot stamping, a glass or ceramic-based casing may be used. The inclusion of a casing 98 around the wires 64, 66 may provide insulation and/or protection of the wires from contact with materials or components that are not intended to be measured by the thermocouple. For example, in the system 10, the blank 12 may rest between dies 20 and 22 in a die set 18 prior to the stamping process. The blank 12 may be held by one or more staging apparatuses 26. Accordingly the portions of the wires 64, 66 that are exposed (e.g., not covered by the adhesive material 90 or insulation) may contact (by design or inadvertently) other materials or components during the measurement process. The casing 98 may prevent the temperature of these other components from affecting the measurements and may electrically insulate the wires from the components. The use of bare wire in the narrow portion 72 may allow electrical contact with the blank, which could allow current to flow through a shorter circuit, thereby shifting the temperature sensing/measuring location of the thermocouple. In embodiments where this may be undesirable, encased TC wires may be used in the narrow portion of the channel.

The wires 64, 66 may extend from the narrow portion 72 and may ultimately be connected to a voltmeter (not shown) or other electronics known to those of ordinary skill in the art for providing the reference junction and determining the voltage between the TC wires 64, 66 (e.g., the wires may connect to a temperature-sensing device). The voltmeter or other electronics may determine a temperature of the blank 12 in the area including the tips 68 of the wire pair 62. As described above, there may be a plurality of wire pairs 62 attached in pairs 80 of channels 70 in the blank 12. Accordingly, a plurality of temperature readings may be generated in various locations within the blank 12. These temperature readings may be used to calibrate, analyze, assess, or otherwise test/improve the performance of a blank forming or treating process (e.g., heat treatment, stamping, quenching, hot stamping, or others). For example, the blank 12 including the device 60 may be used to calibrate or analyze the performance of a hot stamping process, such as the one described above. The temperature readings may be used to ensure that an aluminum blank is solutionized at the correct temperature and that the entire blank is properly solutionized. The readings may also be used to ensure that when the aluminum blank is quenched during the stamping process, the entire blank is cooled at the correct rate and to the correct temperature.

Accordingly, a blank 12 having channels 70 defined therein is provided. The channels may receive and have attached therein thermocouple wires 64, 66 (one per channel). The channels 70 may each have a narrow portion 72 and a wide portion 74, with a transition area 86 where the two portions meet (e.g., the portions may be continuous with each other). The wide portion 74 may be located in an interior 78 of the blank 12 (e.g., spaced from the edges) and the narrow portion 72 may extend from the transition area 86 to one edge 76 of the blank 12. The tips 68 of each wire 64/66 may be attached or fixed to the blank 12 within the wide portion 74 of the channel 70, for example, by welding. The tips 68 may be attached at an end of the wide portion 74 that is opposite from the transition area 86 and the narrow portion 72. An adhesive material 90, such as a metallic composite adhesive, may then be introduced into the wide portion 74 to fill or substantially fill it in. The adhesive material 90 further secures the wire 64/66 in the wide portion 74 to supplement the initial attachment (e.g., weld). The portion of the wire extending out of the wide portion 74 may be inserted into the narrow portion 72 of the channel 70 out to the edge 76. The wire may be secured within the narrow portion 72, for example, by crimping the channel (e.g., by spot chiseling). The portion of the wire extending past the edge 76 may then extend to a voltmeter or other electronics to determine the temperature of the blank 12 near the attachment point.

Figure 9:
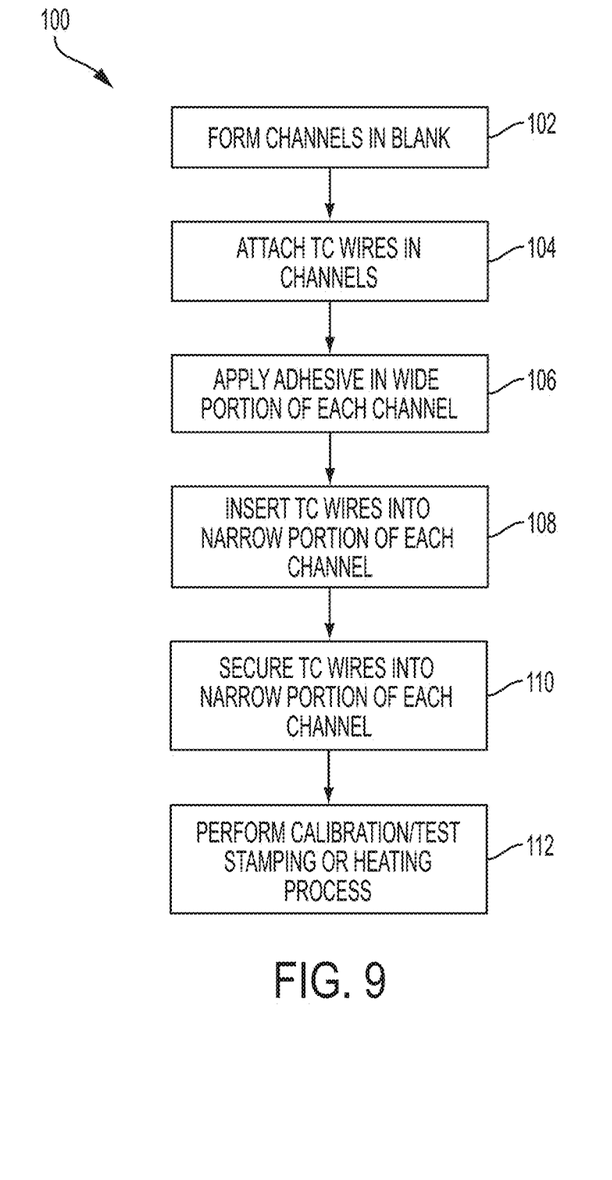
FIG. 9 is a flowchart of a method of forming a temperature-sensing blank, according to an embodiment.

A flowchart 100, shown in FIG. 9, discloses an embodiment for forming the blank 12 having a temperature sensing device 60 incorporated therein. In step 102, channels are formed in the blank. The channels may be formed in pairs, and there may be one or more pairs of channels. The channels may have a narrow portion and a wide portion, with the narrow portion extending from an edge of the blank towards an interior of the blank and terminating in a transition area. The wide portion may extend from the transition area at one end to an opposing end. The channels may be formed using any suitable method, such as by machining.

In step 104, a thermocouple (TC) wire may be attached to each channel. The wires may be attached at the opposing ends of the wide portions of the channels. The wires may be attached using any suitable electrically and thermally conductive connection. In one embodiment, the wires may be welded to the channels. The wires may extend from the opposing end towards and through the transition area within the wide portion of the channel.

In step 106, an adhesive material may be inserted into the wide portions of the channels. The adhesive material may fill or substantially fill the wide portions of the channels. When dried or cured, the adhesive material may be flush with a top surface of the blank or may have a top surface that is below the top surface of the blank. The narrow portions of the channels may be free or substantially free of the adhesive material (e.g., less than 1% filled). In one embodiment, the adhesive material may be a metallic composite adhesive.

In step 108, the portions of the wires that extend out of the wide portions of the channels may be inserted into the narrow portions of the channel. In step 110, the wires may be secured in the narrow portions of the channels. The wires may be secured by deforming the channels such that the wires are held in the channels. In one embodiment, the channels may be deformed by chiseling (e.g., spot chiseling) a plurality of spots along the narrow portion of each channel. After step 110, the blank 12 having a temperature sensing device 60 is formed.

In step 112, the blank 12 having a temperature sensing device 60 incorporated therein may be used to perform a calibration, test, or other analysis process. The blank may be used in a heat treatment, a quench, a stamping process, or any other process where the temperature of the blank 12 may be important. In one embodiment, the blank 12 may be used in a hot stamping process, wherein the blank is heated and then inserted into a cooled stamping die and stamped. The hot stamping process may be for an aluminum blank, wherein the blank is heated to a solutionizing temperature and then stamped in a cooled die set to form and quench the blank.

While the channels 70 have been described with a wide portion 74 and narrow portion 72, the blank 12 may also be formed with channels 70 having a uniform or substantially uniform width. The channels 70 may extend from an edge 76 of the blank 12 to an interior 78 of the blank 12. The tips 68 of the wires 64/66 may be attached at an end of each channel, similar to above, such as by welding. In one embodiment, the adhesive material 90 may applied/inserted into the whole channel 70 from the edge 76 to the attachment point. In this embodiment, the amount of adhesive material 90 used is increased relative to the embodiments with a wide portion 74 and narrow portion 72. In another embodiment, the adhesive material 90 may applied/inserted into a second portion 74 and a first portion 72 may be substantially free of adhesive material 90. This is similar to the embodiments described above, except that portions 72 and 74 have the same or substantially the same width. The adhesive material may be more difficult, costly, and/or time consuming to apply than securing a wire in a narrow channel (e.g., by crimping). Therefore, the embodiments described above with a wide portion 74 and narrow portion 72 may be more time and cost efficient, as well as easier to produce.

In addition, while the blank 12 including a temperature measurement device 60 has been described above with separate channels 70 for each wire 64/66, in another embodiment the pair of wires may share a channel 70. In this embodiment, the wires 64, 66 may have a junction point at or near their tips 68, which may be attached at an end 84 of the wide portion 74 in a similar manner as described above (e.g., by welding). The pair of wires may be secured using an adhesive material 90 and may be secured in a narrow portion 72, similar to described above. The dimensions of the narrow portion 72 may be adjusted to accommodate two wires instead of one. Alternatively, the channel 70 may have a uniform or substantially uniform width, as described above, and the pair of wires 64, 66 may be secured by adhesive material 90 applied/inserted into the whole channel 70. Other alterations to the blank 12 and/or wires 64, 66 to form a shared-channel configuration may be performed and will be apparent to those of ordinary skill in the art based on the present disclosure.

Figure 10:
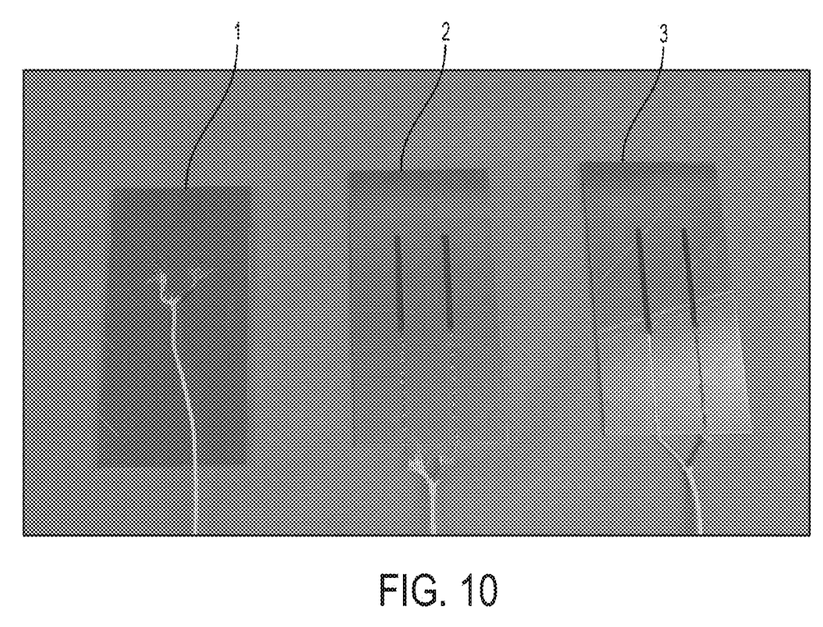
FIG. 10 is a photograph of three sample blank configurations used for testing.
Figure 11:
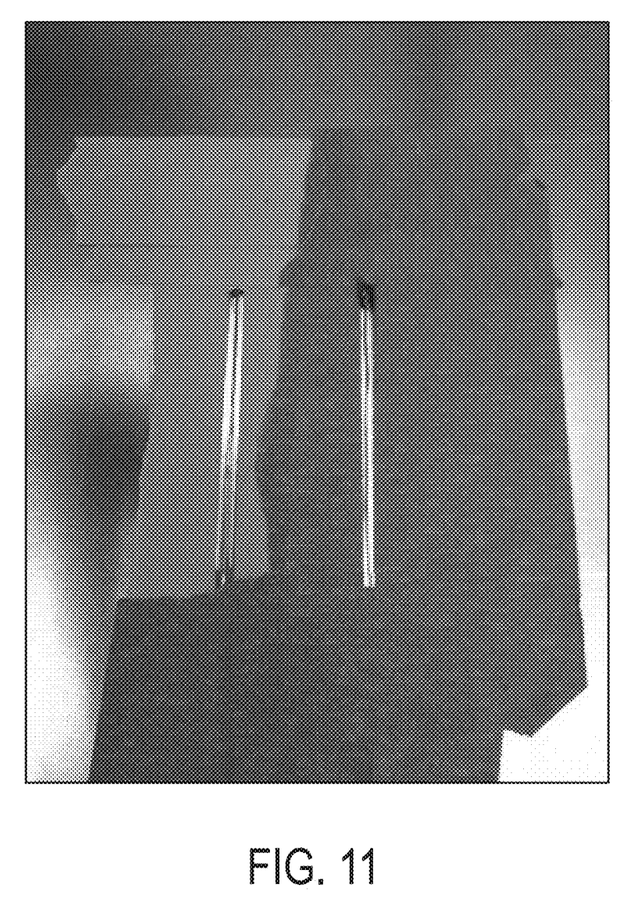
FIG. 11 is a photograph of a sample blank with thermocouple wires welded at one end of each wide channel portion.

With reference to FIGS. 10-13, images of several test blanks are shown, as well as data from several heating and quenching tests. FIG. 10 shows three different test blanks. On the left, a baseline blank (sample 1) is shown in which the TC wires were threaded through holes drilled in the blank. In the middle and on the right, blanks are shown in which the TC wires were welded to the end of the wide portion of the channel (e.g., as shown in FIG. 11). In both blanks, the wide portion was filled with a metallic composite adhesive to further secure the wire in the channel. In the middle sample (sample 2), the TC wires were stripped to the bare metal from the welded tip to just beyond the edge of the blanks. In the sample on the right (sample 3), the TC wires were left with an insulating casing up until the portion that extends within the wide portion of the channel.

Figure 12:
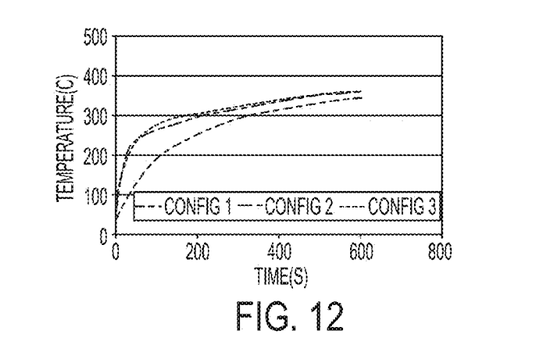
FIG. 12 shows data from a center-heating test of the three samples in FIG. 10.

With reference to FIG. 12, temperature vs. time data is shown for the three samples during a center heating test. During the center heating test, the entire blank was set on the hot plate. As seen in FIG. 12, the baseline sample 1 showed significant lag in measuring the increased temperature and reached a lower temperature (350° C.) than the other samples. Samples 2 and 3 had similar performance and showed reduced lag compared to sample 1. The two samples reached similar temperatures—370° C. and 375° C., respectively.

Figure 13:
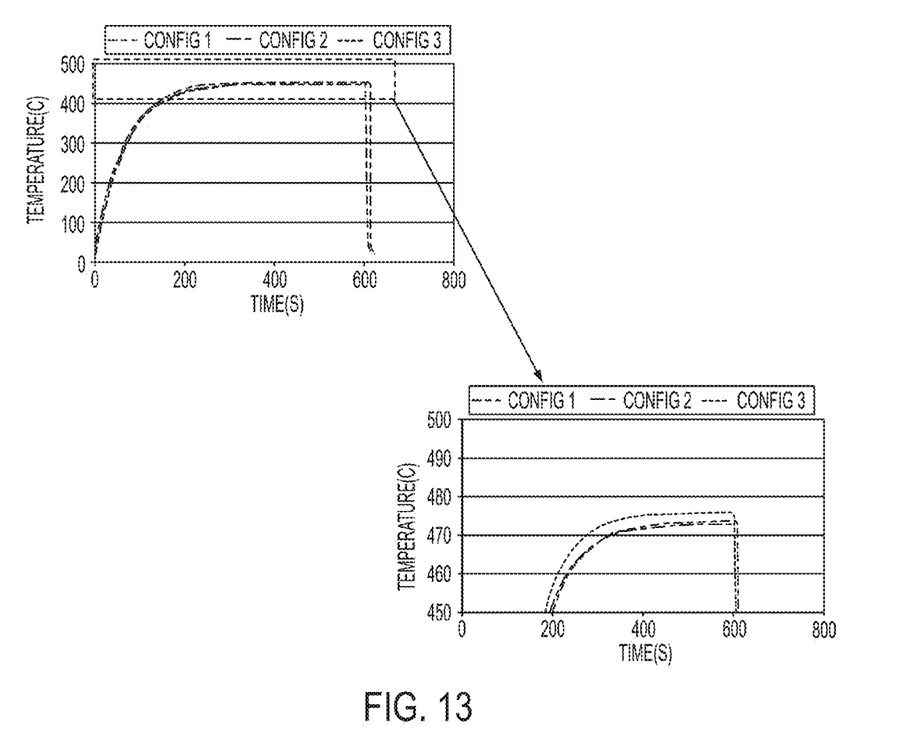
FIG. 13 shows data from a simulated solutionizing heat treatment and quench test of the three samples in FIG. 10.

The results of a heat treatment and quench are shown in FIG. 13, which correspond to the temperatures experienced by a blank during a hot stamping process for high-strength aluminum (e.g., 7xxx series). The samples were heated in a convection furnace set at 480° C. and then quenched in water at room temperature. As seen in FIG. 13, all three samples reached a temperature near the furnace temperature (474° C., 474° C., and 476° C., respectively). As shown in the enlarged portion of the graph, sample 3 performed slightly better, reaching a higher temperature in less time. Accordingly, the results in FIGS. 12-13 show that the blanks with the TC wires welded in a wide portion of a channel and cemented therein by an adhesive provide accurate temperature measurement of their area of the blank with low lag. The time-to-temperature of a component can be an important property of a heating or cooling process, therefore having a low temperature lag may be highly beneficial.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A metal blank comprising:
   a metal sheet having a surface including at least one pair of channels defined therein, each channel having a first portion extending from an edge of the blank and a second portion in an interior of the blank;

at least one pair of thermocouple wires, one wire being attached to each second portion; and an adhesive material disposed in each second portion.

2. The blank of claim 1, wherein the second portion is wider than the first portion.

3. The blank of claim 1, wherein the first portion of each channel extends continuously into the second portion of the channel and the portions meet at a transition area.

4. The blank of claim 1, wherein the wires are attached to each second portion at an end of the second portion opposite the first portion.

5. The blank of claim 1, wherein the wires are welded to each second portion.

6. The blank of claim 1, wherein a portion of each wire is secured within each first portion.

7. The blank of claim 1, wherein each first portion is deformed in at least one region to secure the wire therein.

8. The blank of claim 1, wherein each second portion has a length of 5 to 500 mm, a width of 0.5 to 10 mm, and a depth of 0.25 to 5 mm and each first portion has a width of 0.25 to 3 mm and a depth of 0.25 to 5 mm.

9. The blank of claim 1, wherein each first portion is substantially free of adhesive material.

10. The blank of claim 1, wherein each second portion is substantially filled with the adhesive material.

11. The blank of claim 1, wherein each wire extends from a point of attachment in the second portion of the channel, through the first portion of the channel, and beyond the edge of the blank.

12. A hot-stamping system comprising:

a furnace;

a chillable die set;

a metal blank defining at least two channels extending to an edge, each channel including a first portion and a second portion;

a thermocouple wire attached in the second portion of each channel and extending through the first portion outwardly past the edge;

an adhesive material disposed within each second portion; and each wire connected to a temperature-measuring device.

13. The system of claim 12, wherein the second portion is wider than the first portion.

14. The system of claim 12, wherein the first portion and the second portion meet at a transition area and the wires are attached to each second portion at an end of the second portion opposite the transition area.

15. The system of claim 12, wherein the wires are welded to each second portion and the adhesive material includes a metallic composite adhesive.

16. The system of claim 12, wherein each second portion has a length of 5 to 500 mm, a width of 0.5 to 10 mm, and a depth of 0.25 to 5 mm and each first portion has a width of 0.25 to 3 mm and a depth of 0.25 to 5 mm.

17. A method of manufacturing a temperature-sensing metal blank, comprising:

forming at least one pair of channels in a surface of a metal sheet, each channel including a first portion and a second portion;

attaching one thermocouple wire in the second portion of each channel;

inserting an adhesive material into each second portion; and securing at least a portion of each wire in the first portion of each channel.

18. The method of claim 17, wherein the forming step includes forming each channel with a first, narrower portion and a second, wider portion.

19. The method of claim 17, wherein each second portion is formed in an interior of the metal sheet, each first portion extends from an edge of the metal sheet and meets the second portion at a transition area, and the thermocouple wires are attached at an end of the second portion that is opposite the transition area.

20. The method of claim 17, wherein the attaching step includes welding the thermocouple wires in the second portion of each channel and the adhesive material in the inserting step includes a metallic composite adhesive.

* * * * *